(12) United States Patent
Somerfield

(10) Patent No.: US 11,754,223 B2
(45) Date of Patent: *Sep. 12, 2023

(54) ANCHOR ASSEMBLY

(71) Applicant: GRIPPLE LIMITED, Sheffield (GB)

(72) Inventor: Alan Somerfield, Nottingham (GB)

(73) Assignee: GRIPPLE LIMITED

( * ) Notice: Subject to any disclaimer, the term of this patent is extended or adjusted under 35 U.S.C. 154(b) by 0 days.

This patent is subject to a terminal disclaimer.

(21) Appl. No.: 17/537,918

(22) Filed: Nov. 30, 2021

(65) Prior Publication Data

US 2022/0090737 A1 Mar. 24, 2022

Related U.S. Application Data

(62) Division of application No. 16/615,759, filed as application No. PCT/GB2018/000101 on Jul. 2, 2018, now Pat. No. 11,215,320.

(30) Foreign Application Priority Data

Jul. 3, 2017 (GB) ..................................... 1710671
Jun. 29, 2018 (GB) ..................................... 1810753

(51) Int. Cl.
*F16B 21/00* (2006.01)
*F16M 13/02* (2006.01)
*F16B 2/04* (2006.01)
*F16B 2/18* (2006.01)

(52) U.S. Cl.
CPC ............. *F16M 13/027* (2013.01); *F16B 2/04* (2013.01); *F16B 2/18* (2013.01)

(58) Field of Classification Search
CPC . F16M 13/024; F16B 2/04; F16B 2/18; E04B 9/18; E04B 1/4114; E04B 1/415; Y10T 403/7009
See application file for complete search history.

(56) References Cited

U.S. PATENT DOCUMENTS

| | | | |
|---|---|---|---|
| 1,684,605 A | | 9/1928 | Techmer |
| 2,164,447 A | | 7/1939 | Clarke |
| 2,957,279 A | | 3/1957 | McNair |
| 2,800,231 A | * | 7/1957 | Hicks ..................... E03C 1/264 4/301 |

(Continued)

FOREIGN PATENT DOCUMENTS

| | | |
|---|---|---|
| GB | 395835 | 7/1933 |
| GB | 2492203 | 12/2012 |

(Continued)

*Primary Examiner* — Amy J. Sterling
(74) *Attorney, Agent, or Firm* — Clark Hill PLC; James R. Foley

(57) ABSTRACT

An anchor assembly (10) comprises an anchor (12) comprising a body (15) defining a cavity (16). The anchor (12) further comprises a reinforcing member (18) extending through the cavity (16) and outwardly from the body (15). The anchor assembly (10) further includes an insertion device (14) insertable into the cavity (16). The insertion device (14) comprises a securing member (49) movable between securing and non-securing positions. When the movable securing member (49) is in the securing position in the cavity (16), the securing member (49) can engage the reinforcing member (18) to secure the insertion device (14) to the anchor (12).

11 Claims, 10 Drawing Sheets

(56) References Cited

U.S. PATENT DOCUMENTS

| | | | |
|---|---|---|---|
| 3,066,775 A | | 7/1958 | Valsvik |
| 3,248,994 A | * | 5/1966 | Mortensen .......... F16B 13/0808 411/344 |
| 4,615,514 A | | 10/1986 | Hamlin |
| 4,693,389 A | * | 9/1987 | Kalen ................. G21C 13/067 976/DIG. 176 |
| 5,417,531 A | * | 5/1995 | Brown ................ F16B 13/0808 411/21 |
| 5,898,987 A | | 5/1999 | Onofrio |
| 5,991,984 A | * | 11/1999 | Schaty ................ F16B 13/0808 411/21 |
| 6,884,012 B2 | * | 4/2005 | Panasik ............... F16B 13/0833 411/29 |
| 10,954,666 B2 | | 3/2021 | Somerfield |
| 11,486,432 B2 | * | 11/2022 | Sunkara ................ F16B 13/003 |
| 2008/0108990 A1 | * | 5/2008 | Mitchell ............ A61B 17/7065 606/305 |
| 2009/0249738 A1 | | 10/2009 | Brereton |

FOREIGN PATENT DOCUMENTS

| | | |
|---|---|---|
| JP | 2004169517 | 6/2004 |
| WO | 2012/175907 | 12/2012 |

\* cited by examiner

ANCHOR ASSEMBLY

This invention relates to anchor assemblies. This invention also relates to anchors for use in anchor assemblies. This invention also relates to insertion devices for use in anchor assemblies.

It is known to use anchors in ceilings to suspend items therefrom. The weight that can be supported by such anchors can be limited. Some anchors are provided with insertion devices having movable securing toggles, sometimes it can be difficult to cause the toggle to move to a securing position.

According to one aspect of this invention, there is provided an anchor assembly comprising: an anchor mountable on a support, the anchor comprising a body defining a cavity, the anchor further comprising a reinforcing member extending through the cavity and outwardly from the body; and an insertion device insertable into the cavity, the insertion device comprising a securing member movable between securing and non-securing positions; wherein, when the movable securing member is in the securing position in the cavity, the securing member can engage the reinforcing member to secure the insertion device to the anchor.

According to another aspect of this invention, there is provided an anchor for use with an insertion device having a movable securing member, the anchor comprising: a body defining a cavity, and a reinforcing member extending through the cavity and outwardly from the body, wherein the body comprises a cover member extending over the cavity; wherein the cover member cooperates with the securing member to urge the securing member towards a securing position of the securing member when the insertion device is inserted into the cavity.

The body may define an opening through which the insertion device can be inserted. The reinforcing members may be elongate. The anchor may comprise a plurality of the reinforcing members extending through the cavity and outwardly from the body. The reinforcing members may be arranged around the opening.

The anchor may comprise two of the reinforcing members arranged opposite each other. The opening may be defined between the reinforcing members.

The reinforcing members may be provided to reinforce a curable material disposed over the anchor. The reinforcing members may project into the curable material. The curable material may be concrete.

The body may comprise a cover member which extends over the cavity. When the insertion device is inserted into the cavity, the movable member may engage the cover member, thereby causing the movable member to move to the securing position.

The body may comprise a holding member for holding the reinforcing members. The cover member may be mountable on the holding member. The cavity may be defined between the cover member and the holding member.

The cover member and the holding member may comprise attaching formations to attach the cover member to the holding member. The attaching formations may comprise a socket and a tab receivable in the socket. The attaching formations may comprise a plurality of sockets and a plurality of tabs receivable in the sockets.

The holding member may comprise the socket, or the plurality of sockets. The cover member may comprise the tab, or the plurality of tabs. The cover member may include a cover wall. The, or each, tab may extend from the cover wall.

The holding member may engage the support. The holding member may comprise a support engaging portion to engage the support.

The holding member may be a base portion. The holding member may comprise a receiving formation to receive the reinforcing member. Where the anchor comprises a plurality of the reinforcing members, the body may define a plurality of reinforcing formations to receive the reinforcing members. Where the anchor comprises two of the reinforcing members, the body may define two reinforcing formations to receive the reinforcing members.

The, or each, receiving formation may be defined in the holding member. The body may comprise fastening formations to allow the anchor to be fastened to the support. The fastening formations may be apertures defined by the body. The apertures may be defined by the holding member.

The body may comprise lugs defining the aforesaid apertures. The body may define two oppositely extending lugs. The lugs may be provided on the holding member.

The cover member may comprise an internal surface having an inner region and an outer region. The inner region may be aligned with the opening. The outer region of the internal surface may be concavely curved. The cover wall may extend from the outer region.

The securing member may comprise a cooperating portion having a tip. The cooperating portion may comprise a first surface extending from the tip, and a second surface extending from the first surface. The inner and outer regions of the internal surface may cooperate with the tip to urge the securing member towards the securing position when the insertion device is inserted into the cavity.

According to another aspect of this invention, there is provided an anchor assembly comprising: an anchor mountable on a support, the anchor comprising a body defining a cavity; and an insertion device insertable into the cavity, the insertion device comprising a securing member movable between securing and non-securing positions, the securing member comprising a cooperating portion having a tip, a first surface extending from the tip, and a second surface extending from the first surface; wherein the body comprises a cover member extending over the cavity, the cover member comprising an internal surface having an inner region and an outer region; wherein the inner and outer regions of the internal surface cooperate with the tip to urge the securing member towards the securing position when the insertion device is inserted into the cavity.

According to another aspect of this invention, there is provided an insertion device insertable into a cavity in a body of an anchor, the insertion device comprising: a securing member movable between securing and non-securing positions, the securing member comprising a cooperating portion having a tip, a first surface extending from the tip, and a second surface extending from the first surface; wherein the tip can cooperate with the body of the anchor to urge the securing member towards the securing position when the insertion device is inserted into the cavity.

The insertion device may comprise a main part. The securing member may be attached to the main part. The securing member may be rotatably attached to the main part at an axis point. The securing member has a centre of gravity and the securing member may be rotatably attached to the main part at the centre of gravity.

The securing member may comprise a toggle. The securing member may comprise two of the aforesaid cooperating portions, each cooperating portion comprising a respective tip. The two cooperating portions may be arranged opposite each other. The axis point may be arranged between the two cooperating portions.

The tips of the two cooperating portions may define an axis extending therebetween. The axis may be offset from the centre of gravity of the securing member. The axis may be offset from the axis point.

Each of the two cooperating portions may comprise a respective first surface. Each of the first surfaces may extend from the respective tip. Each of the two cooperating portions may comprise a respective second surface. Each of the second surfaces may extend from the respective first surface. The two second surfaces may, together, form a single central surface.

When the insertion device is inserted into the cavity, the tip may initially engage the inner region of the internal surface.

On further movement of the insertion device into the cavity, cooperation between the tip and the inner region of the internal surface may cause the securing member to move towards the securing position and the tip to engage the outer region of the internal surface.

Cooperation between the tip and the outer region of the internal surface during said further insertion may cause the securing member to move the second surface of the cooperating portion into engagement with the inner region of the internal surface.

The second surface of the cooperating portion may engage the inner region of the internal surface as the insertion device is further moved into the cavity, thereby urging the securing member further towards the securing position. The inner region of the internal surface may cooperate with the second surface of the cooperating portion to urge the securing member towards the securing position when the insertion device is further moved into the cavity.

The, or each, cooperating portion may define a concavity to receive the, or a respective, reinforcing member. The, or each, concavity may be opposite the, or the respective, first surface. The, or each, concavity may be opposite the, or the respective, second surface.

The, or each, reinforcing member may have a convexly curved outer surface. The securing member may be movable to an intermediate position between the securing and non-securing positions. When the securing member is in the intermediate position, the tip of the securing member can engage the outer surface of the reinforcing member.

In one embodiment described herein, the engagement of the tip with the reinforcing member is a condition of unstable equilibrium of the securing member. In this embodiment, a force applied to the insertion device to pull the securing member against the reinforcing member causes the securing member to move either to the securing position or to the non-securing position.

In one embodiment, the anchor assembly may include a locking arrangement to lock the insertion device to the anchor. The locking arrangement may comprise a locking member mountable on the insertion device. The locking member may be mountable on the main part of the insertion device. The locking member may be tightened onto the insertion device to tighten the securing member onto the reinforcing member.

The locking member and the insertion device may include corresponding formations to co-operate with each other and secure the locking member to the insertion device. The corresponding formations may comprise corresponding threads provided on the locking member and the insertion device to allow the locking member to be screwed onto the insertion device. The threads on the insertion device may be provided on the main part.

The locking member may comprise a nut which can be screwed onto the insertion device.

Embodiments of the invention will now be described by way of example only, with reference to the accompanying drawings, in which.

Figure 1:
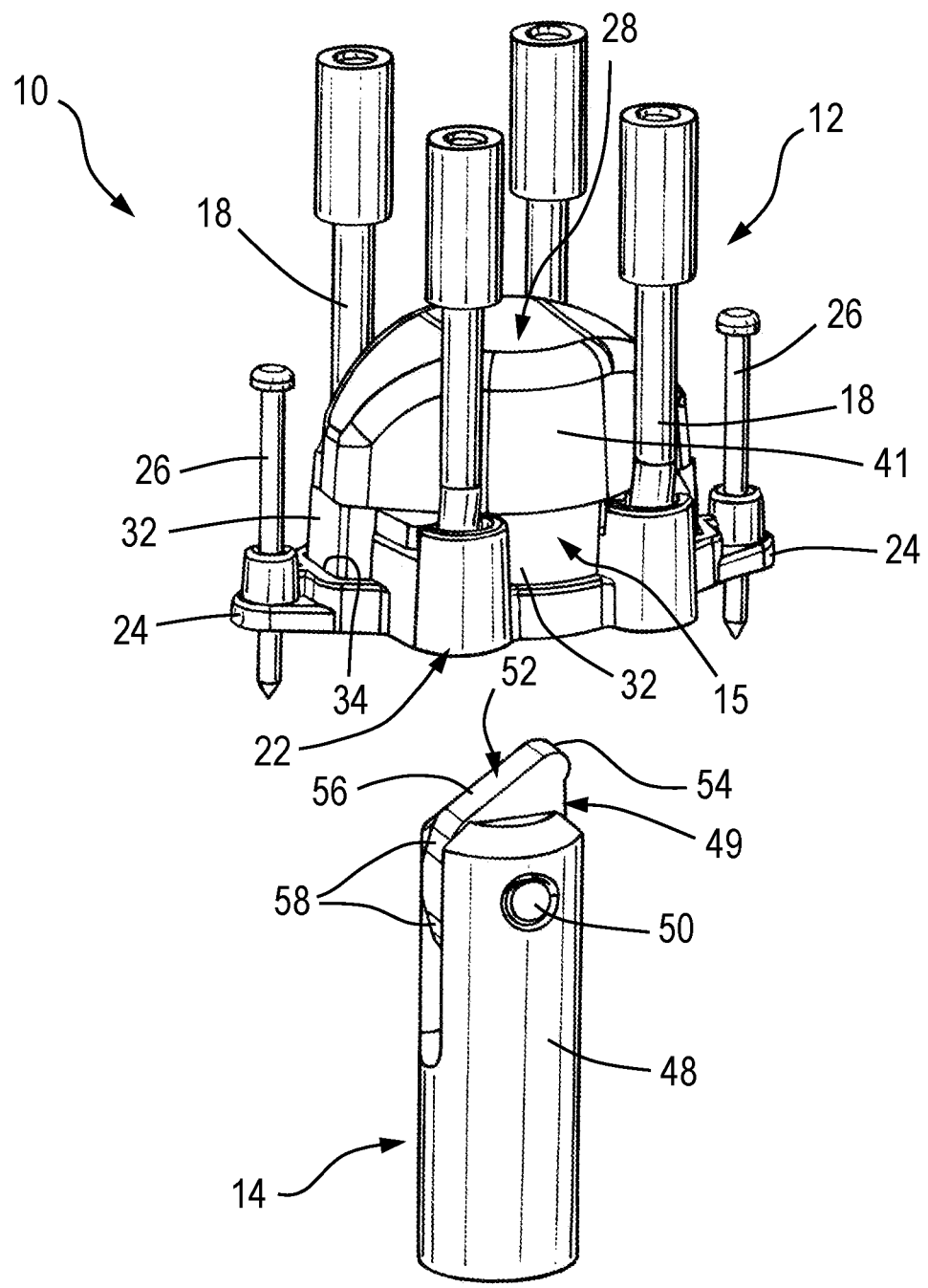
FIG. 1 is a perspective view of an anchor assembly.

The drawings show an anchor assembly 10 for use in a region of a building over which a curable material, such as concrete, is poured. An example of such a region is a floor formed above a ceiling. It is often desirable to suspend articles, such as lighting, from the ceiling.

The anchor assembly 10 comprises an anchor 12 and an insertion device 14. The anchor 12 comprises a body 15 defining a cavity 16. The anchor 12 further includes two elongate reinforcing members 18, in the form of cables, which extend through the body 15 and project outwardly therefrom on opposite sides of the body 15. When the concrete is poured over the anchor 12, the reinforcing members 18 are covered by the concrete. As a result, the reinforcing members 18 provide reinforcement to the concrete. An advantage of the reinforcing members 18 of the embodiment shown is that they are resiliently deformable and will spring back to their non-deformed positions in the event that, for example, a person steps on the anchor 12 before the concrete is poured over it.

The anchor 12 is mounted on a support 20, which may be the ceiling mentioned above. Concrete is poured over the anchor 12 and across the ceiling to form a floor for the room above the ceiling. Therefore, the anchor 12 allows a user to suspend articles from the insertion device 14 inserted into the anchor 12 from the room below the ceiling.

The body 15 comprises a holding member 22 fastened to the support 20. Two fastening formations in the form of lugs 24 are provided on the holding member 22. Each of the lugs 24 defines an aperture through which a fastener 26, such as a nail, can be driven into the support 20, thereby fastening the holding member 22 to the support 20.

The body 15 further includes a cover member 28 mounted on the holding member 22. The cavity 16 is defined between the cover member 28 and the holding member 22. The holding member 22 defines an opening 30 through which the insertion device 14 can be inserted into the cavity 16. The cover member 28 includes axially projecting mounting tabs 32 receivable in sockets 34 defined around the edge of the holding member 22. The tabs 32 are received in the sockets 34 to attach the cover member 28 to the holding member 22.

Figure 3:
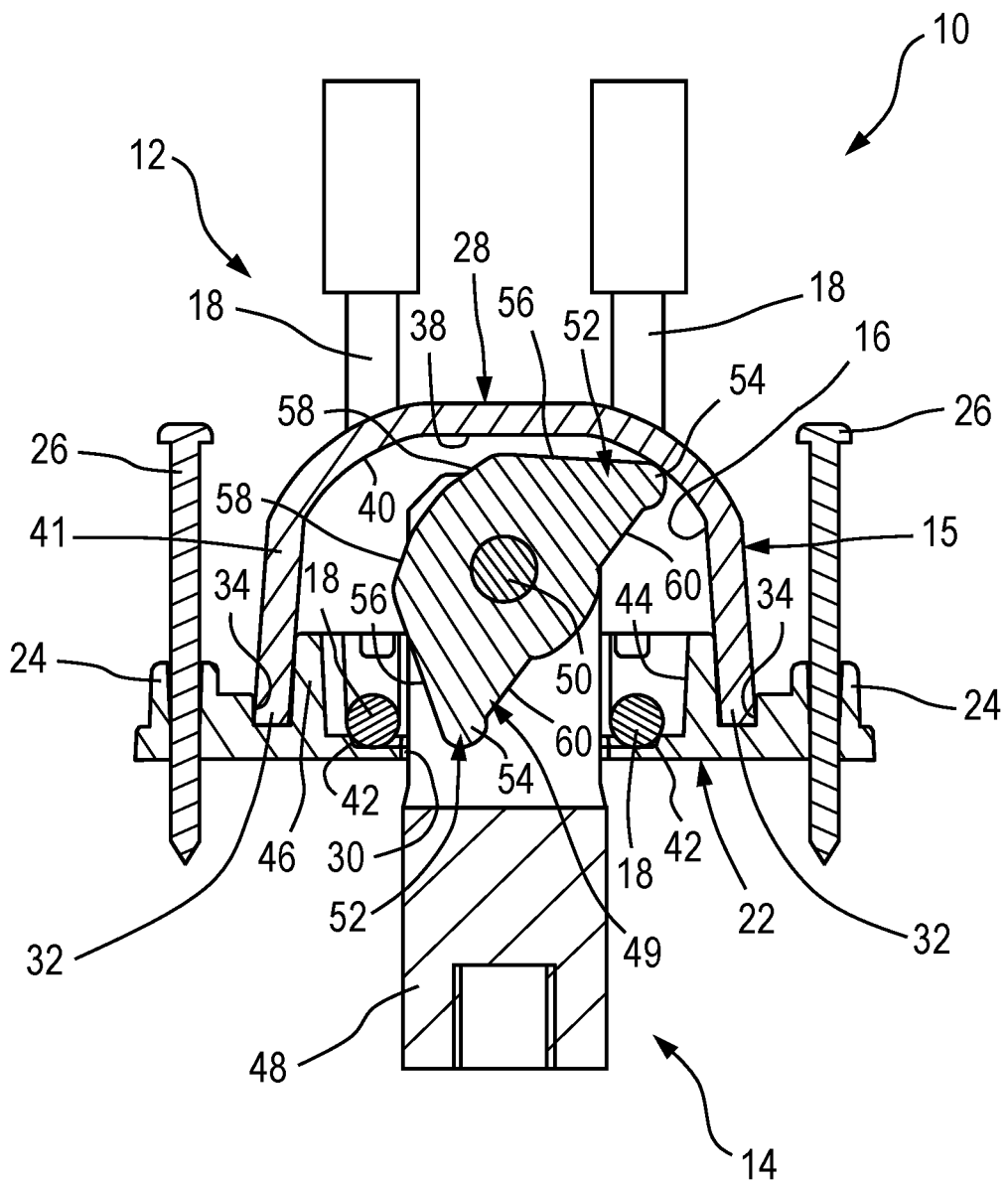
FIG. 3 is a sectional side view of the anchor assembly, showing the insertion device inserted into the cavity defined by the body.
Figure 4:
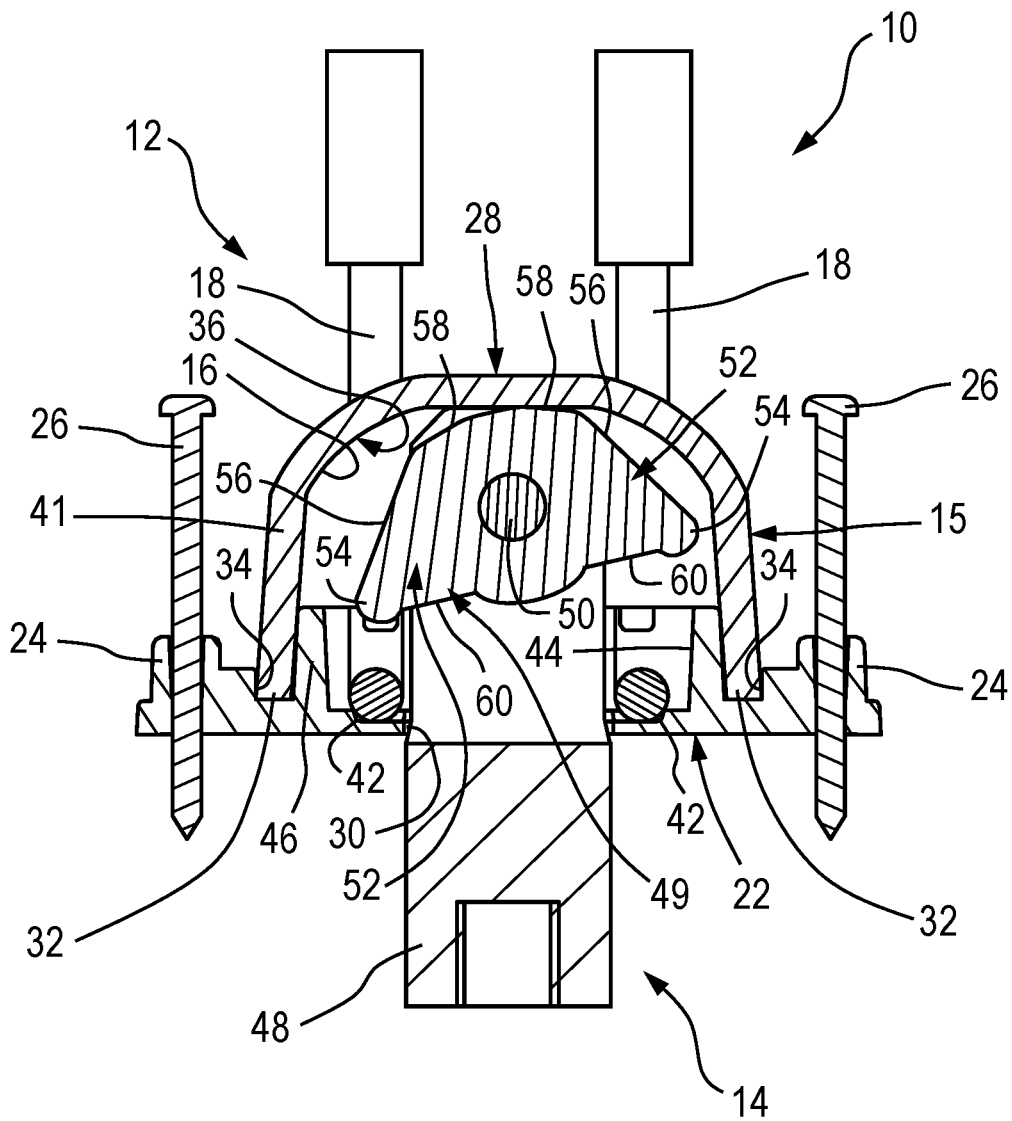
FIG. 4 is a sectional side view of the anchor assembly, showing a securing member moving to a securing position.

The cover member 28 has an internal surface 36 comprising an inner region 38 and an outer region 40. The inner region 38 is aligned with the opening 30. The outer region 40 of the internal surface 36 extends radially outwardly from the inner region 38 and is concavely curved. The cover member 28 also has a cover wall 41 extending around, and from, the outer region 40 (see FIG. 3). The tabs 32 extend from the cover wall 41.

The holding member 22 has two receiving formations 42, in each of which a respective reinforcing member 18 is held. The holding member 22 defines opposed recesses 44, and each of the receiving formations 42 is in the form of a region of a respective one of the recesses 44. The receiving formations 42 are defined opposite each other by the holder 22 within the recesses 44. The opening 30 is defined between the receiving formations 42.

The holding member 22 further comprises a support engaging portion for engaging the support 20. The recesses 44 are defined by a rim member 46, which may be in the form of a wall extending around the support engaging portion. The sockets 34 are defined on the opposite side of the rim member 46 to the recesses 44.

Opposite end regions of each reinforcing member 18 extend out of the body 15 through gaps defined between the cover member 28 and the holding member 22.

The insertion device 14 comprises a main part 48 and a securing member 49 rotatably attached to the main part 48 at an axis point 50. The axis point 50 is arranged at the centre of gravity of the securing member 49. In the embodiment shown, the securing member 49 is in the form of a toggle.

Figure 5:
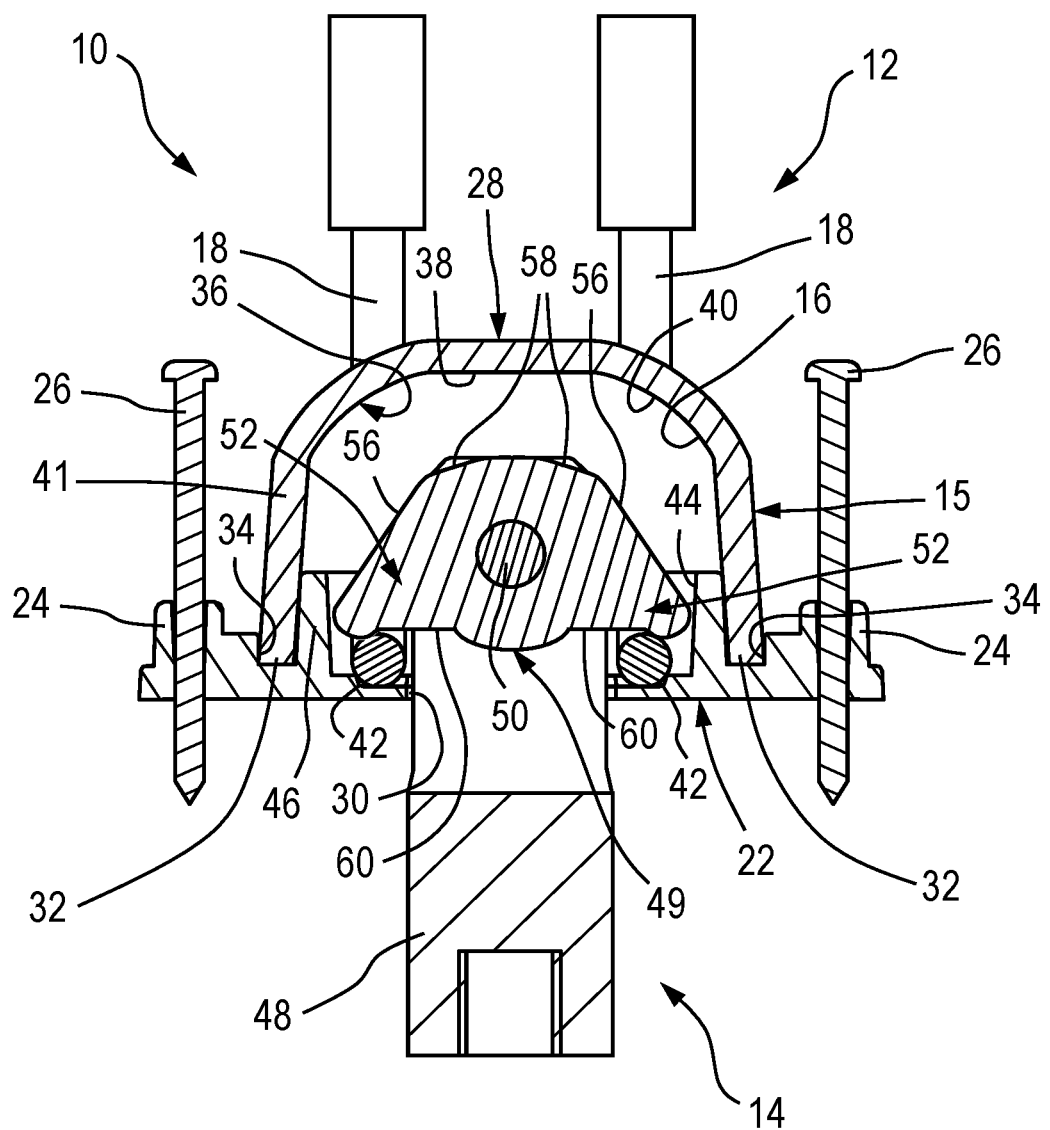
FIG. 5 is a sectional side view of the anchor assembly, showing the securing member in the securing position.
Figure 6:
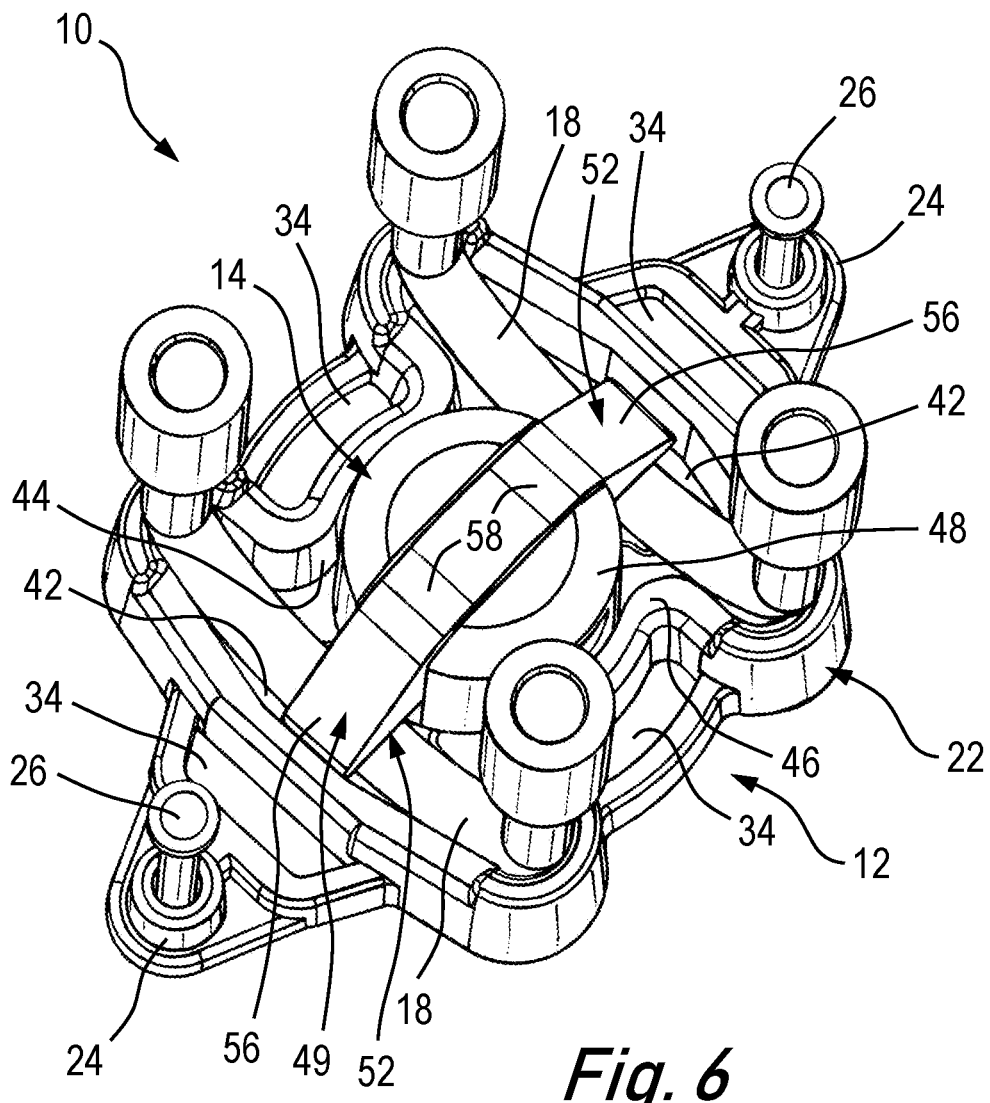
FIG. 6 is a top perspective inside view of the anchor, showing the securing member in the securing position.

The securing member 49 is rotatably movable about the axis point 50 between securing and non-securing positions. The securing position of the securing member 49 is shown in FIGS. 5 and 6. The non-securing position of the securing member 49 is shown in FIGS. 1 and 2.

The securing member 49 comprises two cooperating portions 52, each cooperating portion 52 having a respective tip 54. The two cooperating portions 52 are arranged opposite each other, with the axis point 50 arranged therebetween. The two tips 54 define an axis A represented by a broken line extending therebetween (see FIG. 2). The axis A is offset from the axis point 50 of the securing member 49.

Each of the two cooperating portions 52 comprises a respective first surface 56 extending from the respective tip 54. Each of the two cooperating portions 52 also has a respective second surface 58. Each of the second surfaces 58 extend from the respective first surface 56 to meet at an apex.

Figure 2:
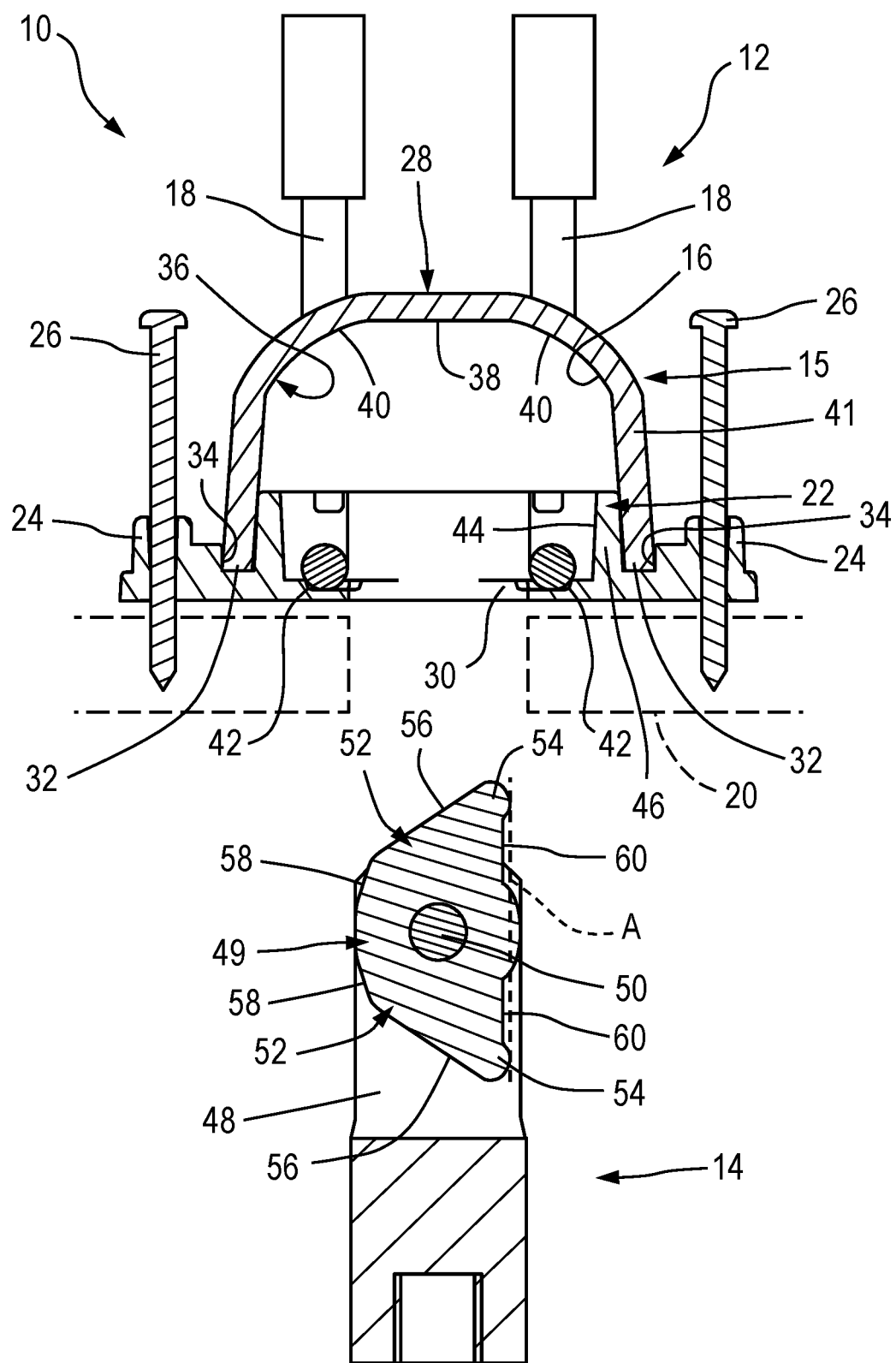
FIG. 2 is a sectional side view of the anchor assembly, showing an insertion device about to be inserted into a cavity defined by a body.

In order to insert the securing member 49 into the cavity 16, the securing member 49 is arranged, as shown in FIGS. 1 and 2 with one of the tips 54 upper most. When the insertion device 14 is inserted into the cavity 16, the tip 54 may initially engage the inner region 38 of the internal surface 36.

Further movement of the insertion device 14 into the cavity 16 causes the securing member 49 to move towards the securing position and the tip 54 to engage the outer region 40 of the internal surface 36. This is caused by cooperation between the tip 54 and the inner region 38 of the internal surface 36, as a result of the offset axis A, Cooperation between the tip 54 and the outer region 40 of the internal surface 36 causes the securing member 49 to move the second surface 58 of the cooperating portion 52 into engagement with the inner region 38 of the internal surface 36. The second surface 58 of the cooperating portion 52 engages the inner region 38 of the internal surface 36 as the insertion device 14 is further moved into the cavity 16. During this movement, the inner region 38 of the internal surface 36 of the cover member 28 cooperates with the second surface 58 of the cooperating portion 52 to urge the securing member 49 further towards the securing position.

The provision of the second surface 58 of the cooperating portion 52, and the flat inner region 38 of the internal surface 36, allows the anchor 12 to be a compact design.

The cooperating portions 52 define respective concavities 60 to receive a respective one of the reinforcing members 18. Each concavity 60 is opposite the respective first and second surfaces 58. When the securing member 49 is in the securing position, the securing member 49 engages the reinforcing members 18, which are received in the concavities 60. The insertion device 14 can be attached to an article to be suspended therefrom. Thus, the weight of the article is transmitted via the reinforcing members 18 to the concrete, thereby allowing a greater weight to be suspended than with prior art anchors.

Figure 7:
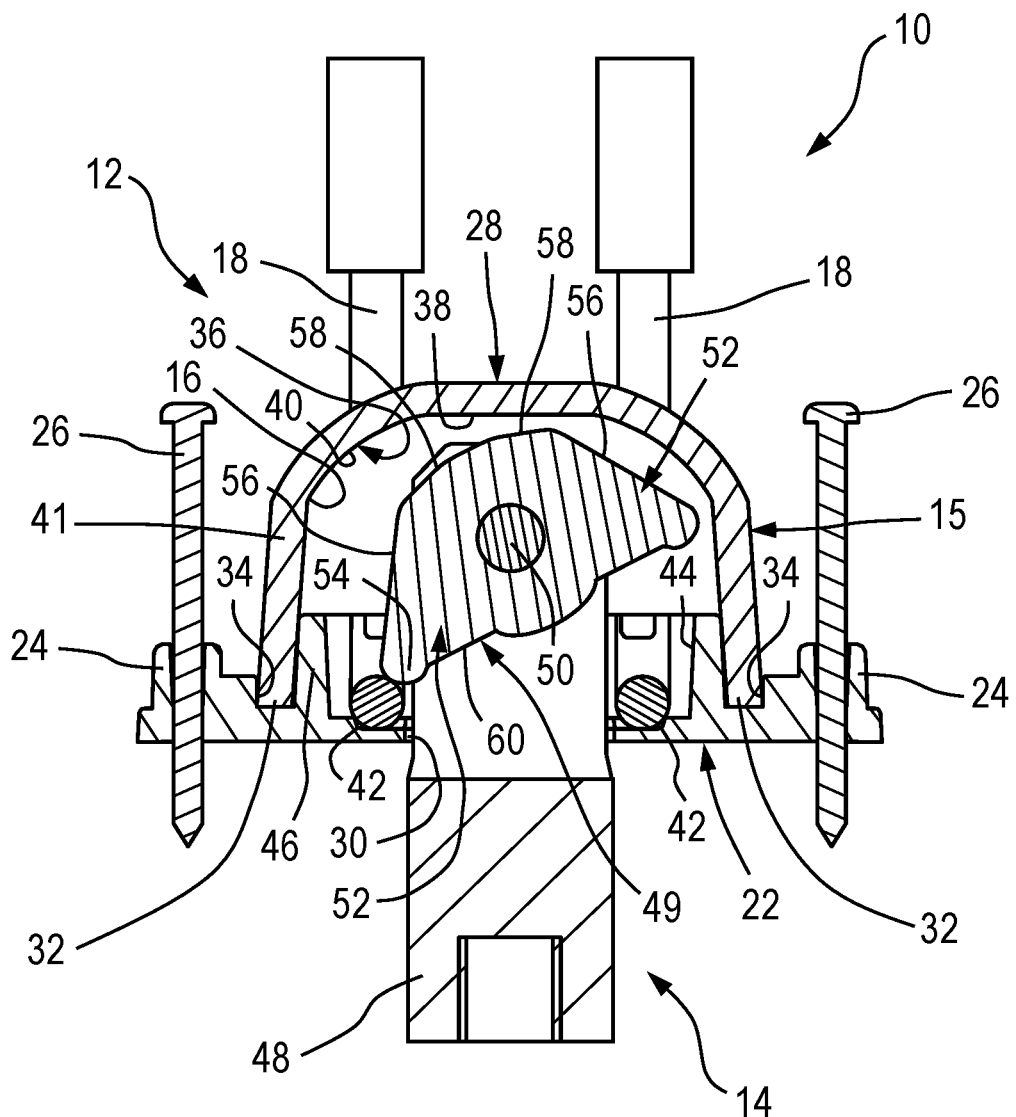
FIG. 7 shows a sectional side view of the anchor assembly, with the securing member in a position of unstable equilibrium.
Figure 8:
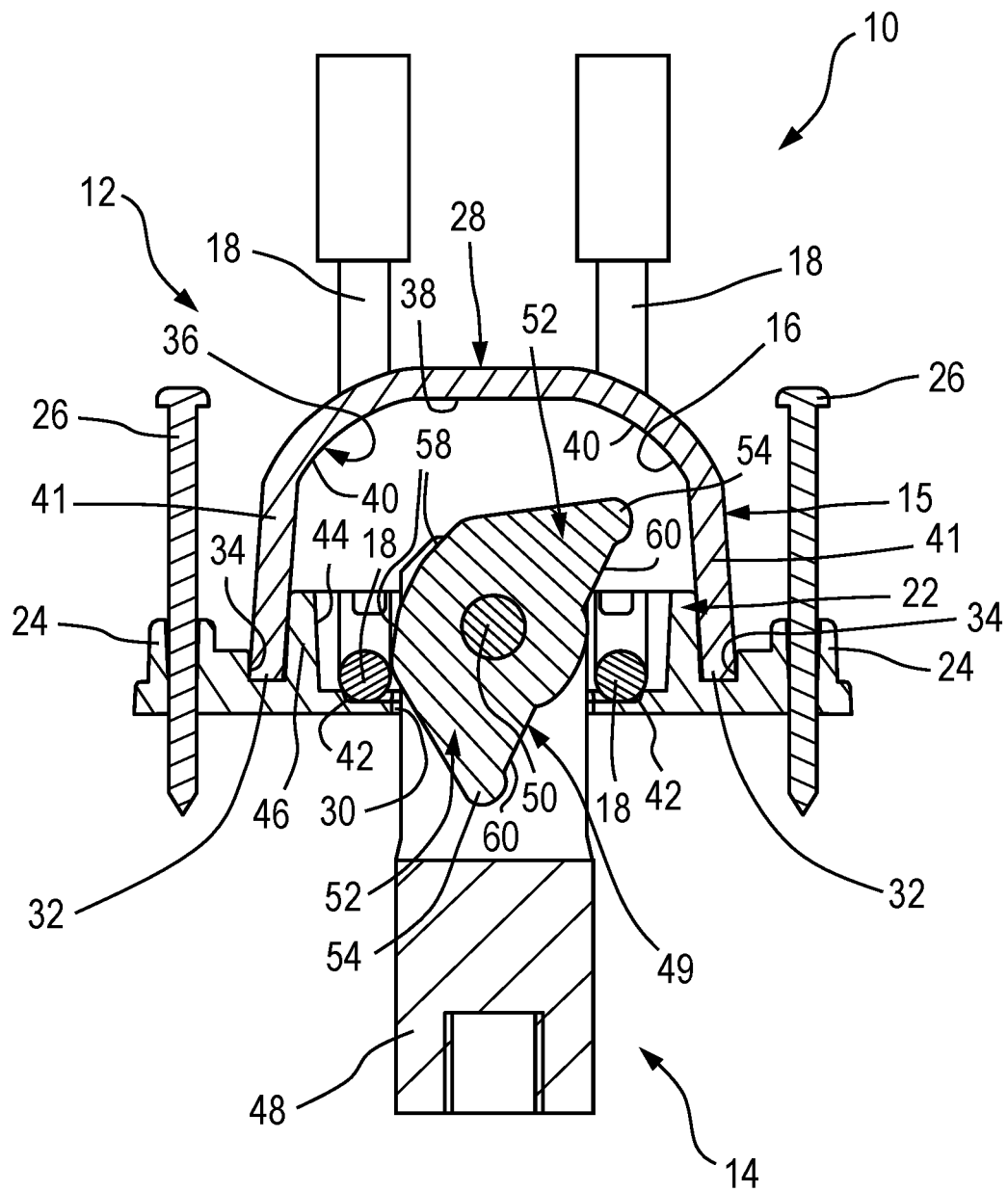
FIG. 8 shows a sectional side view of the anchor assembly after the securing member shown in FIG. 7 moves to a non-securing position when a downward force is applied to the insertion device.

FIGS. 7 and 8 show the situation where the securing member 49 is not moved fully to the securing position before it is moved into engagement with the reinforcing members 18. In FIG. 7, it can be seen that the tip 54 engages the reinforcing member 18. In this position, the securing member 49 is in a condition of unstable equilibrium. A downward force now applied to the insertion device 14 causes the securing member 49 to move either to the securing position shown in FIG. 5, or to the non-securing position shown in FIG. 8, so that the insertion device 14 is pulled downwardly, and the securing member 49 is pulled out of the cavity 16. The user can then reinsert the insertion device 14 into the cavity 16.

There is thus described an anchor assembly 10 comprising an anchor 12 and an insertion device 14 having a securing member 49 rotatably attached to the main part 48 of the insertion device 14 at the centre of gravity of the securing member 49. The anchor 12 includes reinforcing members 18 which are engaged by the securing member 49 to secure the insertion device 14 to the anchor 12. The anchor 12 includes a cover member 28 having an internal surface 36 that can cooperate with the securing member 49 to urge the securing member 49 to its securing position.

Figure 9:
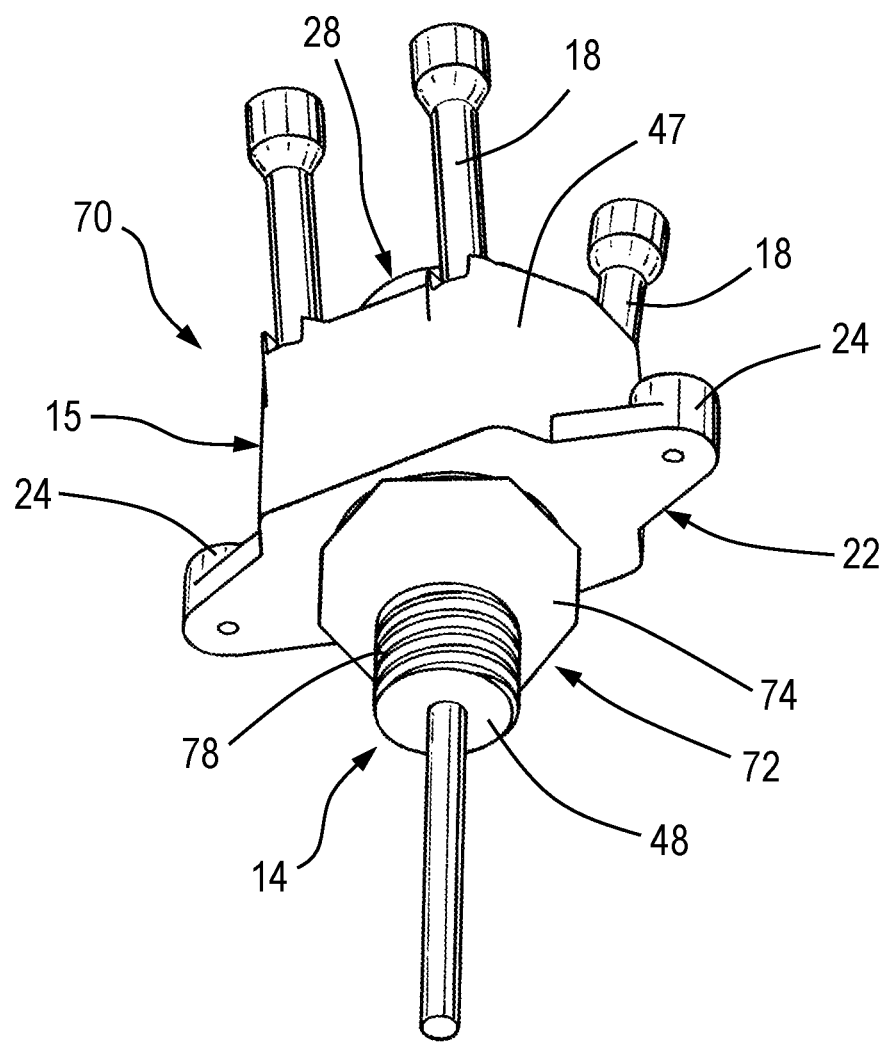
FIG. 9 is a bottom perspective view of a further anchor assembly.
Figure 10:
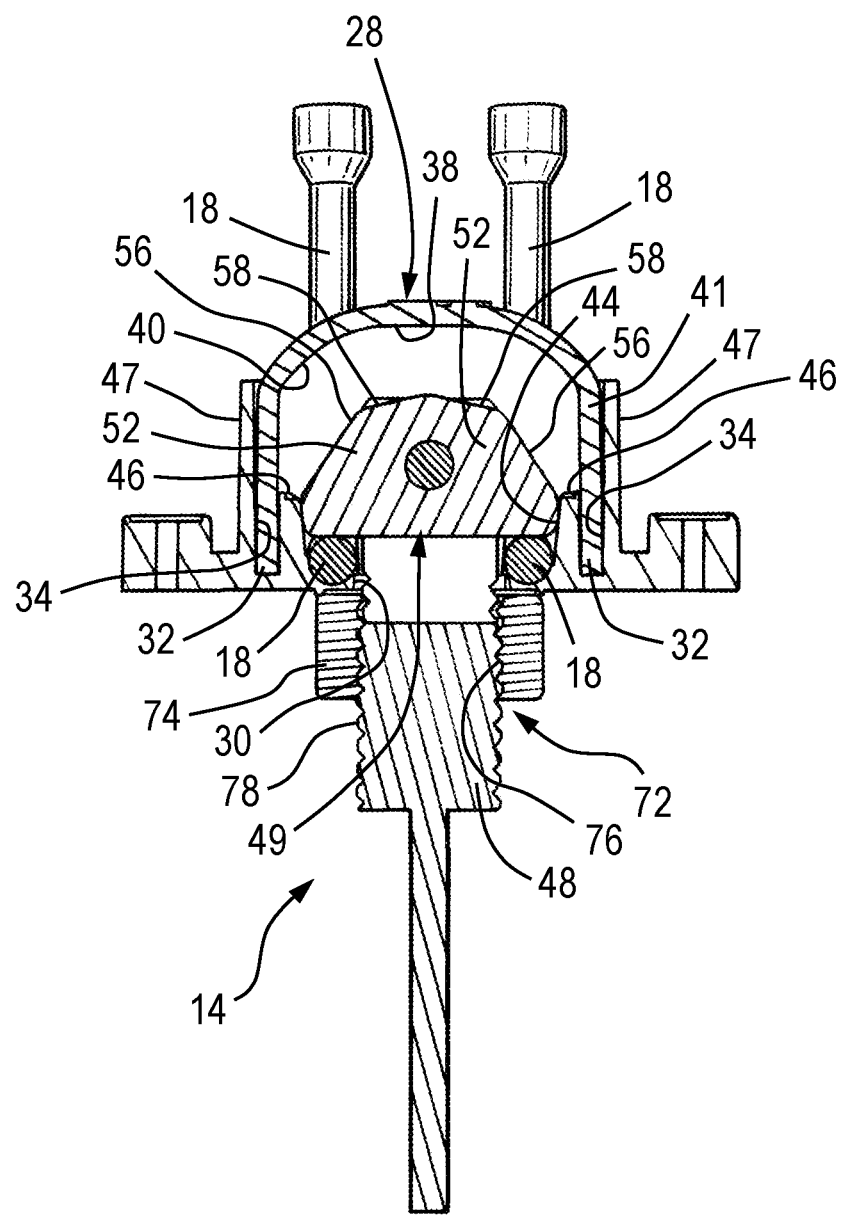
FIG. 10 is sectional side view of the anchor assembly shown in FIG. 9, in which the securing member is in the securing position.

Various modifications can be made without departing from the scope of the invention. FIGS. 9 and 10 show a further anchor assembly 70, which comprises many of the same features of the anchor assembly 10 described above. The features of the anchor assembly 70 that are the same as the corresponding features of the anchor assembly 10 are designated with the same reference numerals.

The anchor assembly 70 differs from the anchor assembly 10 in that the sockets 34 are defined between the rim member 46 and an outer wall 47. The outer wall 47 extends around the rim member 48, and around the cover member 28 when the tabs 32 of the cover member 28 are received in the sockets 34. The outer wall 47 extends around, and is the same height as, the cover wall 41. Thus, the cover wall 41 and the outer wall 47 provide protection against the ingress of concrete into the cavity 16 when the concrete is poured over the anchor 12.

The anchor assembly 70 further includes a locking arrangement 72 comprising a locking member 74 having internal threads 76. The locking member 74 is in the form of nut. The locking arrangement 72 further includes external threads 78 formed on the main part 48.

The insertion device 14 is inserted through the opening 30 defined in the holding member 22, and then manipulated so that the securing member 49 engages the reinforcing members 18 in the securing position. The locking member 74 is screwed onto the threaded main part 48 to engage the underside of the holding member 22. The locking member 74 is then tightened against the holding member 22 to pull the securing member 22 into tight engagement with the reinforcing members, thereby locking the securing member 22 against the reinforcing members 18

The embodiment shown in FIGS. 9 and 10, provides the advantage that the possibility of the securing member 22 becoming dislodged from the reinforcing members, for example during seismic events, is significantly reduced.

The invention claimed is:

1. An insertion device insertable into a cavity in a body of an anchor, the insertion device comprising:
    a securing member movable between securing and non-securing positions, the securing member comprising two cooperating portions, each cooperating portion comprising a respective tip, the two cooperating portions being arranged opposite each other;
    wherein each of the tips can cooperate with the body of the anchor to urge the securing member towards the securing position when the insertion device is inserted into the cavity;
    wherein each of the two cooperating portions comprises a respective first surface and a respective second surface, each of the first surfaces extending from the respective tip, and each of the second surfaces extending from the respective first surface; and
    wherein the two second surfaces meet at an apex and together form a single central surface.

2. An insertion device according to claim 1, wherein insertion device comprises a main part, the securing member being rotatably attached to the main part.

3. An insertion device according to claim 1, wherein the securing member has a centre of gravity and the securing member is rotatably attached to the main part at the centre of gravity.

4. An insertion device according to claim 1, wherein the insertion device includes a locking arrangement to lock the insertion device to the anchor, the locking arrangement comprising a locking member mountable on the main part.

5. An insertion device according to claim 1, wherein the locking member is configured to be tightened onto the insertion device to tighten the securing member onto a reinforcing member.

6. An insertion device according to claim 5, wherein the locking arrangement includes corresponding formations on the locking member and on the insertion device, the corresponding formations being co-operable with each other to secure the locking member to the insertion device.

7. An insertion device according to claim 6, wherein the corresponding formations comprise corresponding threads provided on the locking member and the insertion device to allow the locking member to be screwed onto the insertion device.

8. An insertion device according to claim 1, wherein the securing member comprises two of the aforesaid cooperating portions, each cooperating portion comprising a respective tip, the two cooperating portions being arranged opposite each other.

9. An insertion device according to claim 8, wherein each of the two cooperating portions comprises a respective first surface and a respective second surface, each of the first surfaces extending from the respective tip, and each of the second surfaces extending from the respective first surface.

10. An insertion device according to claim 3, wherein the tips of the two cooperating portions define an axis extending therebetween, the axis being offset from the centre of gravity of the securing member.

11. An insertion device according to claim 1, wherein the, or each, cooperating portion defines a concavity to receive the, or a respective, reinforcing member, the, or each, concavity being opposite the, or the respective, first surface.

* * * * *